US006868349B2

(12) United States Patent
Fletcher et al.

(10) Patent No.: US 6,868,349 B2
(45) Date of Patent: Mar. 15, 2005

(54) METHOD AND DEVICES FOR WIRELESS COMMUNICATION BETWEEN TEST AND CONTROL DEVICES AND POWER DISTRIBUTION DEVICES

(75) Inventors: David Fletcher, Simsbury, CT (US); Gregory Lavoie, Bristol, CT (US); Indrajit Purkayastha, Weatogue, CT (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/063,256

(22) Filed: Apr. 4, 2002

(65) Prior Publication Data

US 2003/0191589 A1 Oct. 9, 2003

(51) Int. Cl.[7] .................................................. G01F 19/00
(52) U.S. Cl. .......................................... 702/62; 455/3.01
(58) Field of Search ........................ 702/60, 61, 64–68, 702/187, 62, 188; 356/51, 399; 700/9, 10, 291, 294, 256, 22, 65, 244; 455/3.01, 3.05

(56) References Cited

U.S. PATENT DOCUMENTS

| | | | | | |
|---|---|---|---|---|---|
| 4,814,712 | A | | 3/1989 | Burton et al. | 324/424 |
| 5,272,438 | A | | 12/1993 | Stumme | 324/424 |
| 5,387,994 | A | * | 2/1995 | McCormack et al. | 398/117 |
| 5,514,964 | A | | 5/1996 | Benesh et al. | 324/509 |
| 5,737,231 | A | | 4/1998 | Pyle et al. | 364/483 |
| 5,825,643 | A | | 10/1998 | Dvorak et al. | 364/140 |
| 5,831,428 | A | | 11/1998 | Pyle et al. | 324/142 |
| 5,872,722 | A | | 2/1999 | Oravetz et al. | 364/528.27 |
| 6,005,759 | A | * | 12/1999 | Hart et al. | 361/66 |
| 6,157,527 | A | * | 12/2000 | Spencer et al. | 361/64 |
| 6,236,332 | B1 | * | 5/2001 | Conkright et al. | 340/3.1 |
| 6,308,061 | B1 | * | 10/2001 | Criss et al. | 455/418 |
| 6,330,516 | B1 | * | 12/2001 | Kammeter | 702/60 |
| 6,356,426 | B1 | * | 3/2002 | Dougherty | 361/102 |
| 6,507,762 | B1 | * | 1/2003 | Amro et al. | 700/83 |

OTHER PUBLICATIONS

"Port Redirect Feature: Addendum to the POWERLOGIC Circuit Monitor Series 4000", by Schneider Electric (Jan. 2002) pp. 1–4, Square D Company (LaVergne, TN).

* cited by examiner

*Primary Examiner*—Edward Raymond
(74) *Attorney, Agent, or Firm*—Cantor Colburn LLP

(57) ABSTRACT

A wireless system is provided which comprises a test and control device, and a power distribution device. The test and control device has a first microprocessor executing a first firmware. The power distribution device has a second microprocessor executing a second firmware. The first microprocessor is coupled a first wireless communications port, and the second microprocessor is coupled to a second wireless communication port. The first and second wireless communication ports are configured to communicate wireless communications there between.

27 Claims, 2 Drawing Sheets

METHOD AND DEVICES FOR WIRELESS COMMUNICATION BETWEEN TEST AND CONTROL DEVICES AND POWER DISTRIBUTION DEVICES

BACKGROUND OF INVENTION

This disclosure generally relates to test and control devices and power distribution devices. More particularly, this disclosure relates to methods and devices for wireless communication between test and control devices and power distribution devices.

Communication with power distribution devices, such as electronic trip units, relays, meters and the like, is required. Such communication includes functions such as testing the device, controlling the device, programming the device, collecting or viewing data from the device and the like. This communication occurs through the use of a test and control device "specific for" or "dedicated to" the power distribution device to be communicated with. Moreover, such communication currently requires a physical connection between the dedicated test and control device and the power distribution device. An example of such a dedicated and physically connected system is illustrated in FIG. 1. In this example, a dedicated test and control device 10 is shown physically connected by way of cable 11 to a power distribution device 12.

U.S. Pat. No. 4,814,712 to Burton et al describes such a dedicated test and control device requiring a physical connection. U.S. Pat. No. 5,825,643 to Dvorak et al. and U.S. Pat. No. 5,872,722 to Oravetz et al. describe such physically connected, dedicated test and control devices that allow for adjustment and coordination of set points within the power distribution device.

SUMMARY OF INVENTION

A wireless system is provided which comprises a test and control device, and a power distribution device. The test and control device has a first microprocessor executing a first firmware. The power distribution device has a second microprocessor executing a second firmware. The first microprocessor is coupled to a first wireless communications port, and the second microprocessor is coupled to a second wireless communication port. The first and second wireless communication ports are configured to communicate wireless communications there between.

A method of testing and controlling a power distribution device having a first wireless communication port is provided. The method includes providing a test and control device having a microprocessor, firmware, and a second wireless communication port; and sending a wireless communication between the first and second wireless communication ports.

A test and control device is provided. The test and control device includes a microprocessor, a first wireless communication port, and firmware. The microprocessor is coupled to the first wireless communications port. The firmware operates the test and control device. The first wireless communication port sends and receives wireless communications to and from, respectively, a second wireless communication port of one or more target power distribution devices.

A power distribution device is provided which comprises a microprocessor, a first wireless communication port, and firmware. The wireless communication port is coupled to the microprocessor. The firmware operates the power distribution device. The first wireless communication port sends and receives wireless communication to and from, respectively, a second wireless communication port of a test and control device.

The above-described and other embodiments, features and advantages are appreciated and understood by those skilled in the art from the following detailed description, drawings, and appended claims.

BRIEF DESCRIPTION OF DRAWINGS

Referring to the exemplary drawings wherein like elements are numbered alike in the several Figures.

DETAILED DESCRIPTION

Figure 1:
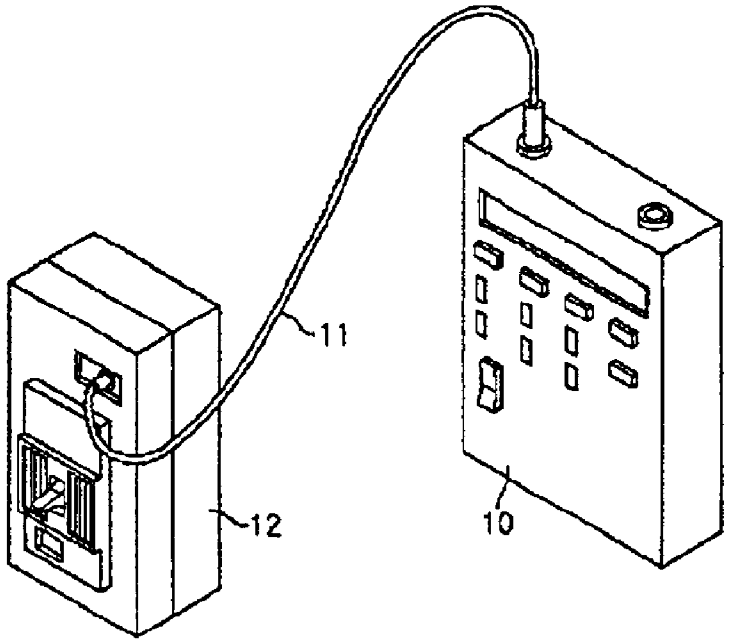
FIG. 1 is a perspective view of a dedicated test and control device physically connected to a power distribution device.
Figure 2:
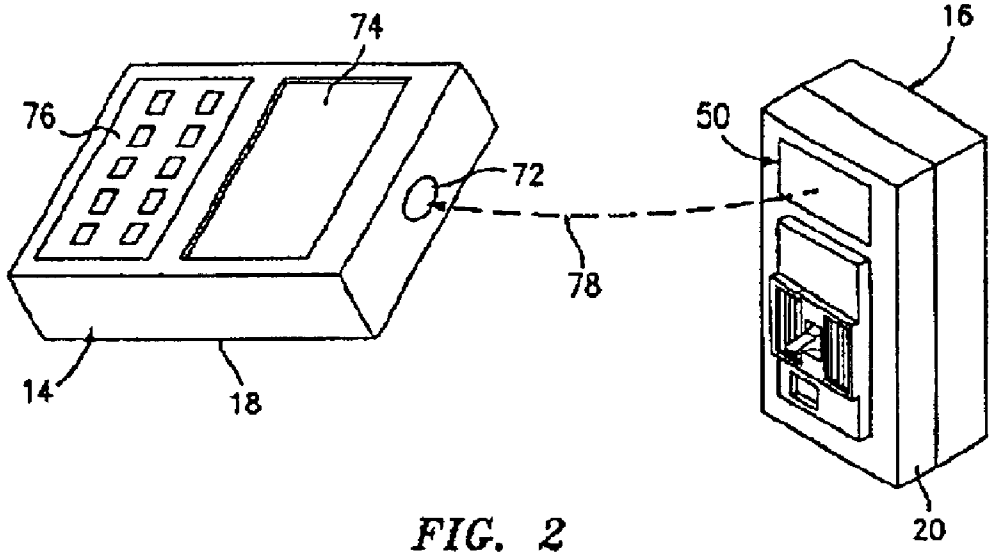
FIG. 2 is a perspective view of an exemplary embodiment of a test and control device wirelessly communicating with a power distribution device.

Referring now to FIG. 2, an exemplary embodiment of a test and control device 14 is illustrated. The test and control device 14 is illustrated communicating through a wireless connection with a wireless power distribution device 16. By way of example, the test and control device 14 includes personal digital assistants (PDA), laptop or notebook computers, or other similar portable devices having a microprocessor. Additionally, the power distribution device 16 is, for example, a circuit breaker having an electronic trip unit, a programmable relay, a meter, and the like.

In the exemplary embodiment illustrated in FIG. 2, the test and control device 14 is a handheld PDA 18 and the power distribution device 16 is a circuit breaker 20 having an electronic trip unit 22. Of course, it should be recognized that other test and control devices 14 and/or other power distribution devices 16 are contemplated.

The PDA 18 and the trip unit 22 are configured to wirelessly communicate to one another. For example, and as described in detail below, the PDA 18 is configured to display data generated by the trip unit 22, wirelessly upgrade software or firmware to the trip unit, wirelessly adjust set points in the trip unit, initiate self test programs in the trip unit, and the like.

Figure 3:
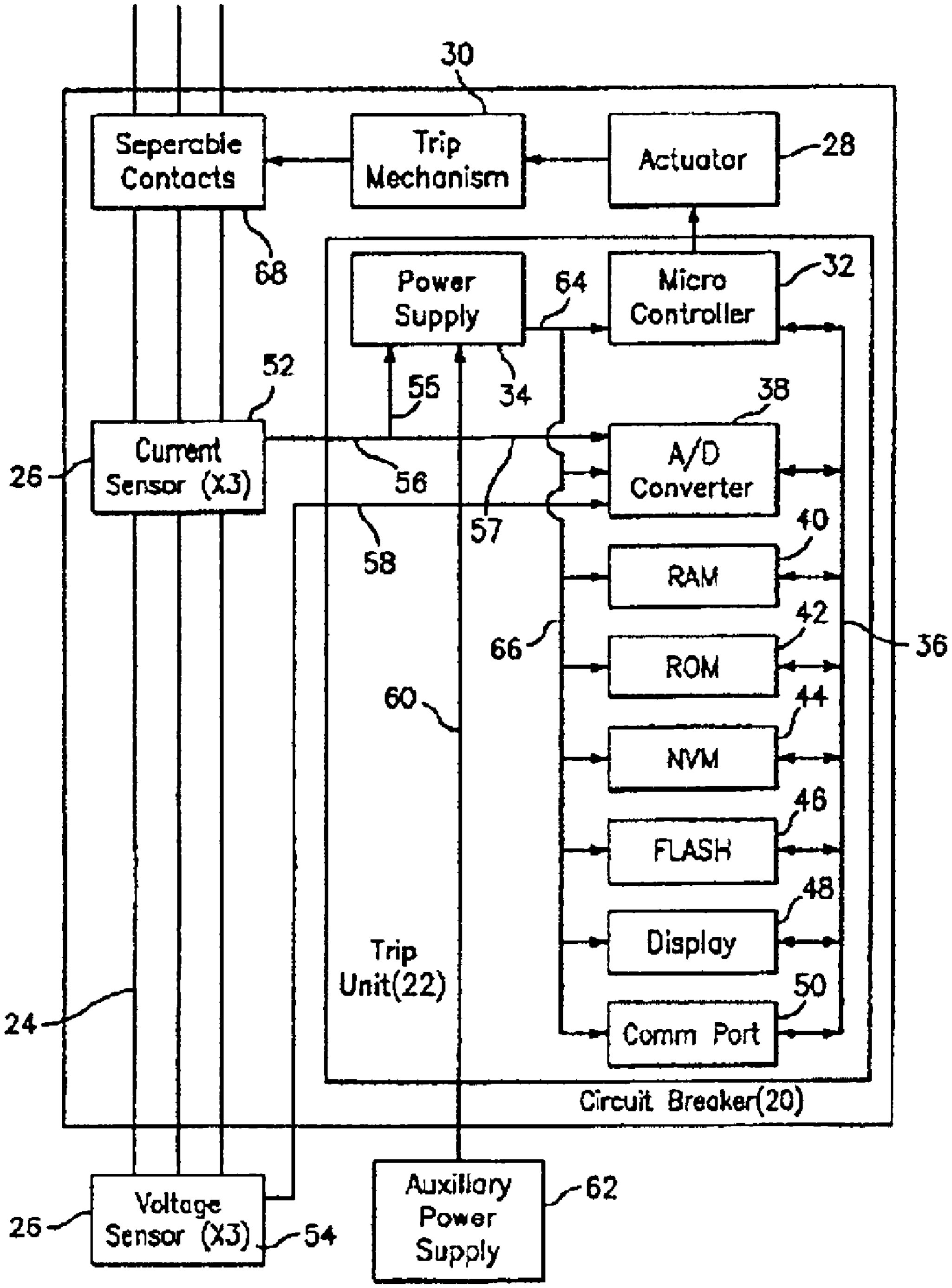
FIG. 3 is a schematic block diagram of an exemplary embodiment of a power distribution device.

An exemplary embodiment of the electronic trip unit 22 is illustrated in FIG. 3. Here, the trip unit 22 is illustrated operatively connected to a power system 24 by way of the circuit breaker 20. The power system 24 is illustrated, by way of example only, as a three-phase power system.

The circuit breaker 20 comprises sensors 26, an actuator 28, and a trip mechanism 30. The sensors 26 are configured to detect, for example, the current, the voltage, and the like in the power system 24.

The trip unit 22 comprises a microprocessor 32, a power supply 34, and one or more peripherals that communicate with the microprocessor over a data path or bus 36. The peripherals can include, for example, an analog to digital (A/D) converter 38, random access memory (RAM) 40, read only memory (ROM) 42, non-volatile memory (NVM) 44, flash memory 46, a display 48, and a wireless communications port 50. Here, the non-volatile memory 44 is configured to retain system information and programming during a power interruption or outage in the power system 24. Data, typically depicting the status of the trip unit 22, is displayed by the display 48 in response to display signals received from the microprocessor 32 over the data path 36. It should be recognized that it is contemplated for some or all of the peripherals to be internal to the microprocessor 32.

In the illustrated embodiment, the sensors 26 include a current sensor 52 and a voltage sensor 54 for each phase of the three-phase power system. The current sensors 52 provide a first output 56, which simultaneously provides a current 55 to the power supply 34, and a current-sensing signal 57 to the A/D converter 38. The current 55 is proportional to the current in the power system 24, but is stepped down by a predetermined ratio. For example, where the current sensor 52 has a 1000:1 ratio, and the power system 24 has 1000 amps, the current 55 provided by the sensor is about one amp. Here, the current-sensing signal 57 is indicative of the condition of the current in the power system 24.

The voltage sensor 54 provides a voltage-sensing signal 58 to the A/D converter 38. Here, the voltage-sensing signal 58 is indicative of the condition of the voltage in the power system 24.

The power supply 34 is also configured to receive an auxiliary current 60 from an auxiliary power source 62. Accordingly, the power supply 34 receives the current 55 from the current sensor 52, the auxiliary current 60 from the auxiliary power source 62, or a combination thereof.

The power supply 34 is configured to provide power to the trip unit 22. For example, the trip unit 22 (e.g., microprocessor 32, the converter 38, memory 40, 42, 44, and 46, display 48, and port 50) receives an operating current 64 from the power supply 34 over power distribution lines 66.

The trip unit 22 includes main functionality firmware for the operation of the trip unit, including initializing parameters, boot code, and operational parameters. The firmware defines the operational parameters of the trip unit 22, including trip curve characteristics such as instantaneous, short time, long time, ground fault trip, and the like. The firmware is executed by the microprocessor 32 and is stored within the trip unit 22 either internal or external to the microprocessor.

The PDA 18 also operates based on computer program instructions or firmware executed by a microprocessor (not shown). Again, the firmware of the PDA 18 is stored internal or external to its microprocessor.

In use, the circuit breaker 20 includes separable contacts 68 which are operably connected to the trip mechanism 30. The contacts 68 are in a normally closed position so that power can pass through the power system 24 to a load (not shown). The sensors 52 and 54 provide the analog signals 57 and 58, respectively, to the A/D converter 38, which converts these analog signals to digital signals. The digital signals are transferred over the data path 36 to the microprocessor 32.

The microprocessor 32 compares the condition of the power in the power system 24 as provided by the signals 57 and 58 to a predetermined set of protection parameters. In the event that the microprocessor 32 detects that one or more of the protection parameters are met, the microprocessor energizes the actuator 28. In turn, the actuator 28 opens the contacts 68 of the power system 24 via the trip mechanism 30. In an exemplary embodiment, the trip mechanism 30 is a mechanical device configured to drive open the contacts 68. In this manner, the trip unit 22 activates the circuit breaker 20 to open the contacts 68 so that power cannot pass through the power system 24 to the load.

Referring again to FIG. 2, the PDA 18 is illustrated wirelessly communicating to the trip unit 22. As described above, the trip unit 22 includes the wireless communications port 50. Similarly, the PDA 18 also includes a wireless communications port 72. The communication ports 50 and 72 are configured to communicate wirelessly with one another.

The PDA 18 further includes a display screen 74, a data entry device 76 such as, but not limited to a keypad, a mouse, and the like, and firmware corresponding to the firmware of the hand held device. In alternate embodiments, the display screen 74 is a touch screen and thus incorporates the data entry device 76 therein.

The wireless communications ports 50 and 72 include infrared communication ports, radio frequency communication ports, and the like. Thus, if a wireless communication 78 is sent by the PDA 18 from the port 72, it is received by the trip unit 22 at the port 50. Conversely, if the wireless communication 78 is sent by the trip unit 22 from the port 50, then it is received by the PDA 18 at the port 72.

In an exemplary embodiment, the ports 50 and 72 are infrared communication ports and the wireless communication 78 is an infrared signal. Thus, the trip unit 22 and the PDA 18 include infrared programming instructions such as that provided by the infrared protocols of the Infrared Data Association (IRDA).

Accordingly, the wireless communication 78 allows information (e.g., waveforms, metering data, etc.) from the trip unit 22 to be viewed at the display screen 74 of the PDA 18. Additionally, information (e.g., set point adjustments, software updates, initiation of self testing programs, etc.) can be communicated from the PDA 18 to the trip unit 22. In an exemplary embodiment, the wireless communications 78 include one or more of waveform data, metering data, set point adjustments, software updates, operational data, status data, configuration data, and initiation of power distribution device self testing programs.

In an exemplary embodiment, the PDA 18 is configured to communicate with various types of trip units 22, separately and/or simultaneously. Accordingly and in this manner, the test and control device 14 (described herein by example as the PDA 18) eliminates the need for dedicated test and control devices for different power distribution devices 16 (described herein by example as the circuit breaker 20 having the trip unit 22).

The power distribution device 16 is commonly assembled together in a central location with other power distribution devices, such as in switchgear, switchboards, and the like. Thus, the test and control device 14 allows a user to communicate, separately and/or simultaneously, with all of the properly equipped power distribution devices 16 in the central location. In this manner, the test and control test 14 is a general purpose device. Namely, the test and control test 14 can include firmware for communicating with more than one type of power distribution device 16. Thus, the test and control device 14 is not "specific for" or "dedicated to" one power distribution device, which mitigates the need to have more than one test and control device 14.

The wireless communication 78 increases the safety of a user by eliminating the need for the user to make a physical connection between the test and control device 14 and the power distribution device 16, thus reducing the potential for electric shock.

The activation of the separable contacts 68 may cause one or more illumination sources to be inactivated. In this instance, the test and control device 14 can still be used. Namely, the test and control device 14 can be used in low illumination conditions since the wireless communication ports 50 and 72 require no direct connection and since the display screen 74 is powered by the test and control device.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wireless system for an electrical power distribution system, comprising:

a test and control device having a first microprocessor executing a first firmware, said first microprocessor being operatively coupled to a first wireless communication port; and an electronically controlled circuit breaker having a second microprocessor executing a second firmware, said second microprocessor being operatively coupled to a second wireless communication port, said first wireless communication port and said second wireless communication port being configured to communicate wireless communications between said electronically controlled circuit breaker and said test and control device;

wherein said wireless communications comprises a software update from said test and control device to said electronically controlled circuit breaker;

said electronically circuit breaker further having an operating parameter controlling of a mechanical operating characteristic of said circuit breaker, wherein subsequent to said wireless communications said software update causes a change in said operating parameter that causes said mechanical operating characteristic of said circuit breaker to change as a result of said software update.

2. The wireless system as in claim 1, further comprising a first display screen and a first data entry device operatively coupled to said first microprocessor, and/or a second display screen and a second data entry device operatively coupled to said second microprocessor.

3. The wireless system as in claim 1, wherein said test and control device is a lap top computer or a personal digital assistant and said electronically controlled circuit breaker further comprises an electronic trip unit, a programmable relay, a meter, or any combination comprising at least one of the foregoing.

4. The wireless system as in claim 3, wherein said first and second wireless communication ports comprise infrared communication ports or radio frequency communication ports.

5. The wireless system as in claim 3, wherein said wireless communications comprises waveform data, metering data, set point adjustments, software updates, operational data, status data, configuration data, initiation of power distribution device self testing programs, or any combination comprising at least one of the foregoing.

6. The wireless system as in claim 1, wherein said first wireless communications port is further configured to simultaneously communicate wireless communications between said test and control device and a plurality of said electronically controlled circuit breakers.

7. The wireless system of claim 1, wherein:

said operating parameter comprises a current value set point; and said mechanical operating characteristic comprises the opening of separable contacts as a function of a detected current exceeding said current value set point, said current value set point being adjustable via said software update.

8. A method of testing and controlling an electronically controlled circuit breaker having a first wireless communication port, comprising:

activating a test and control device having a microprocessor, firmware and a second wireless communication port; and sending wireless communications between said first and second wireless communication ports;

wherein said wireless communications comprises a software update from said test and control device to said electronically controlled circuit breaker;

wherein subsequent to said wireless communications said software update causes a change in an operating parameter of said circuit breaker that causes a mechanical operating characteristic of said circuit breaker to change as a result of said software update.

9. The method as in claim 8, wherein said test and control device is a lap top computer or a personal digital assistant comprising one or more of a display screen and a data entry device.

10. The method as in claim 9, wherein said wireless communications are infrared communications or radio frequency communications.

11. The method as in claim 8, wherein said electronically controlled circuit breaker further comprises an electronic trip unit, a programmable relay, a meter, or any combination comprising at least one of the foregoing.

12. The method as in claim 11, wherein said wireless communications comprises waveform data, metering data, set point adjustments, software updates, operational data, status data, configuration data, and initiation of power distribution device self testing programs, or any combination comprising at least one of the foregoing.

13. The method as in claim 8, wherein said sending wireless communications further comprises simultaneously sending wireless communications between said test and control device and a plurality of said electronically controlled circuit breakers.

14. A test and control device, comprising:

a microprocessor;

a first wireless communication port in electrical communication with said microprocessor; and firmware for operating said test and control device, said first wireless communication port being configured to send and receive wireless communication to/from a second wireless communication port of one or more target electronically controlled circuit breakers;

wherein said wireless communication comprises a software update from said test and control device to said one or more target circuit breakers;

wherein subsequent to said wireless communications said software update causes a change in an operating parameter of said target circuit breakers that causes a mechanical operating characteristic of said target circuit breakers to change as a result of said software update.

15. The test and control device as in claim 14, wherein said test and control device is a lap top computer or a personal digital assistant.

16. The test and control device as in claim 15, further comprising a display screen and/or a data entry device in electrical communication with said microprocessor.

17. The test and control device as in claim 15, wherein said first and second wireless communication ports are infrared communication ports or radio frequency communication ports.

18. The test and control device as in claim 17, wherein said one or more target electronically controlled circuit breakers further comprise an electronic trip unit, a programmable relay, a meter, or any combination comprising at least one of the foregoing.

19. The test and control device as in claim 18, wherein said wireless communication comprises waveform data, metering data, set point adjustments, software updates, operational data, status data, configuration data, initiation of power distribution device self testing programs, or any combination comprising at least one of the foregoing.

20. The test and control device as in claim 14, wherein said first wireless communication port is further configured to simultaneously communicate wireless communications between said test and control device and a plurality of said electronically controlled circuit breakers.

21. A power distribution device, comprising:

a microprocessor;

a first wireless communication port operatively coupled to said microprocessor; and firmware for operating said power distribution device, said first wireless communication port being configured to send and receive wireless communications to/from a second wireless communication port of a test and control device;

wherein said wireless communications comprises a software update from said test and control device to said power distribution device;

wherein subsequent to said wireless communications said software update causes a change in an operating parameter of said power distribution device that causes a mechanical operating characteristic of said power distribution device to change as a result of said software update.

22. The power distribution device as in claim 21, wherein said first and second wireless communication ports are infrared communication ports or radio frequency communication ports.

23. The power distribution device as in claim 22, wherein said power distribution device comprises a circuit breaker having an electronic trip unit, a programmable relay, a meter, or any combination comprising at least one of the foregoing.

24. The power distribution device as in claim 21, wherein said wireless communications comprise waveform data, metering data, set point adjustments, software updates, operational data, status data, configuration data, initiation of power distribution device self testing programs, or any combination comprising at least one of the foregoing.

25. The power distribution device as in claim 24, wherein said test and control device comprises a lap top computer or a personal digital assistant.

26. The power distribution device as in claim 21, wherein said second wireless communication port is configured to simultaneously communicate wireless communications between said test and control device and a plurality of said power distribution devices.

27. The power distribution device of claim 21, where:

said operating parameter comprises a current value set point; and said mechanical operating characteristic comprises the opening of separable contacts as a function of a detected current exceeding said current value set point, said current value set point being adjustable via said software update.

* * * * *